3,647,831
Patented Mar. 7, 1972

3,647,831
PROCESSES FOR PREPARING EQUILENIN COMPOUNDS
Robert Ginsig, Cuernavaca, Morelos, Mexico, assignor to Syntex Corporation, Panama, Panama
No Drawing. Filed Feb. 26, 1970, Ser. No. 14,625
Int. Cl. C07c *169/08*
U.S. Cl. 260—397.45     13 Claims

ABSTRACT OF THE DISCLOSURE

Methods of synthesizing equilenin compounds from the corresponding natural or synthetic equilin compounds. The methods are characterized by the steps of (1) epoxidizing an equilin compound to the corresponding 7,8-epoxy saturated B ring compound and, (2) cleaving the epoxy ring and concomitantly introducing the equilenin B ring aromatization.

BACKGROUND OF THE INVENTION

(1) Background of the invention

This invention relates to methods for synthesizing equilenin compounds from the corresponding equilin compounds. In a further aspect this invention relates to the synthesis of equilenin sulfates from the corresponding equilin compounds.

(2) Prior art

Equilin and equilenin are naturally occurring steroids which are commonly derived commercially from an extract of pregnant mares' urine. These compounds are particularly useful because of their estrogenic properties in the treatment of various hormonal associated disorders such as, for example, menopause syndrome and menstruational abnormalities. The compounds are further useful as intermediates in the preparation of estrogenic active compounds having characteristics (e.g. side effects, estrogenic activity, etc.) which are more desirable for the treatment of a given disorder related to estrogenic deficiencies. The naturally obtained equilin and equilenin compounds are however subject to two prominent commercial disadvantages:

(1) The source of natural estrogens (e.g. pregnant mares' urine) is not subject to sufficient control to permit accurate predication of the total quantity and quality of source material which will be available during a given duration; and (2) The naturally obtained products have an inherent unpleasant odor which cannot be easily disguised or masked. Thus it would be very desirable to develop synthetic methods of manufacturing these materials, thereby providing greater product control and the elimination of the aforementioned odor. Unfortunately, both classes of compounds have been found to be difficult to prepare synthetically, and especially so the equilenin compounds as these compounds are typically prepared from equilin and thus are subject to the rigors of synthetic equilin production as well as to the rigors of the prior art processes used to effect the conversion to equilenin. The prior art processes for effecting this conversion also frequently result in the production of undesired 14β-derivatives. Therefore, even though the prior art has developed a number of methods for synthetically producing these compounds (note Fieser and Fieser, Steroids, Reinhold Publishing Corporation (1959), pages 480–487) it would be very desirable to develop methods of preparing equilenin which are less burdensome and do not result in the production of undesired products. Accordingly, I have discovered felicitous methods of preparing equilenin compounds from the corresponding equilin compounds.

SUMMARY

In summary, equilenin compounds are prepared, according to my invention, by a two-step reaction process which comprises:

(1) Epoxidizing an equilin compound at the B ring 7(8) double bond to form the corresponding compound having a completely saturated B ring and a 7,8-epoxy ring in place of the 7,8-double bond present in equilin; and (2) Cleaving the epoxy and introducing the B ring equilenin aromatization.

Separation of the equilenin compound from reactants and catalyst residues and/or byproducts can be affected by conventional extraction methods well known to the art and well within the scope of one having ordinary skill in the art. Suitable methods include, for example, crystallization, solvent extraction, chromatography and the like.

The details of my invention including preferred embodiments will be more fully described herein below.

DETAILED DESCRIPTION OF THE INVENTION AND PREFERRED EMBODIMENTS

The process of preparing equilenin compounds according to my invention can be typically represented by the following overall schematic reaction equations:

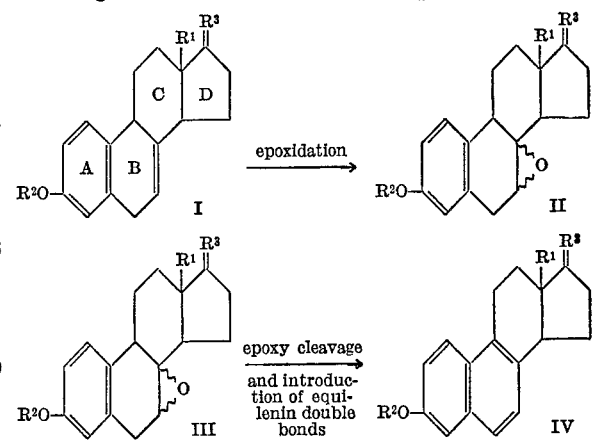

wherein $R^1$ is a lower alkyl having 1 through 6 carbon atoms; $R^2O$ is hydroxy or hydrolyzable ester or ether having less than 12 carbon atoms; $R^3$ is oxo or the group

wherein $R^4$ is H or ethynyl; and the wavy epoxy bond lines indicate that the oxygen atom can be α or β.

The equilin compound starting material (I) can be either naturally derived or prepared synthetically, but preferably will be synthetically prepared to avoid the disadvantages of the naturally derived products, previously discussed. Suitable synthetic processes are, for example, described in U.S. Pats. Nos. 3,162,655; 3,325,519; 3,344,-156; 3,395,078; and 2,930,805 (equilin 3-alkyl ether). The substitution of different $R^2O$ groups can be effected by conventional procedures, such as for example esterification or alkylation of equilin at the 3-hydroxy position. Also where 3-inorganic salts of equilenin are desired, the starting material can be a 3-inorganic salt of equilin (e.g. equilin-3-monosulfate) though generally it is preferable that the inorganic moiety be added after the conversion of the equilin compound to an equilenin compound.

Considering now the process of my invention in greater detail, the 7,8-epoxy equilin compound is obtained by treating an equilin compound of Formula I, preferably where $R=CH_3$; $R^2=H$ and $R^3=CH_3$ with a solution of a suitable epoxidation agent in a suitable liquid carrier medium. Suitable epoxidation agents include, for example, monoperphthalic acid, perbenzoic acid, m-chloroperbenzoic acid, and the like. Suitable and preferred carrier mediums will, of course, vary with the particular epoxidation agent used, but typically include, for example, benzene, ether, methylene dichloride, tetrahydrofuran, chloroform and the liked and suitable mixtures thereof. I have further found that best results are obtained by using a solution of monoperphthalic acid in a tetrahydrofuran-chloroform mixture, and accordingly I will more specifically describe this embodiment, though it should be appreciated that same general relationship can be applied with minor modification to any suitable epoxidation agent-liquid carrier system.

Typically, mole ratios in the range of about from 1.1 to 10 mols of monoperphthalic acid per mol of equilin compound can be used, and best results are obtained with mol ratios in the range of about 5 mols of monoperphthalic acid per mol of equilin compound. Also, mol ratios both above and below these can be used, but typically result in poorer yields. Typical mol ranges for other epoxidation agents can be obtained by correlation with the active peroxide equivalents per mol of the epoxidation agent as compared with monoperphthalic acid which has one active peroxide equivalent per mole. Thus, for example, the typical ratio range for both perbenzoic acid and m-chloroperbenzoic acid will be the same as for monoperphthalic acid. The weight ratio of liquid carrier to equilin compound will typically be in the range of about from 3 to 10 parts of carrier per part of equilin compound. Though again, weight ratios both above and below this ratio can be used depending upon the particular equilin compound used and its solubility in the liquid carrier. Also, as before noted, different epoxidation agents will have different preferred liquid carrier; thus for example, both benzene or chloroform are typical liquid carriers in epoxidation reactions for perbenzoic acid. Other suitable liquid carriers for various epoxidation agent can be obtained from the literature, such as for example, Fieser and Fieser, Reagents for Organic Synthesis, Wiley (1967). Preferred carrier mediums and optimum concentration can be obtained by routine experimentation.

Typically, the reaction is carried out at temperatures in the range of about from −5 to 50° C. with best results being obtained using temperatures within the range of about from 0 to 5° C. Preferably, the reaction should be allowed to proceed for about from 4 to 48 hours to ensure desirable yields. The resulting 7,8-epoxy equilin product can then be separated from the reaction mass by any suitable separation procedure. For example, I have found that the separation can be advantageously carried out by aqueous alkaline extraction of the 7,8-epoxy equilin product followed by further purification by recrystallization with acetone. Preferably, the reaction product mass should be washed prior to evaporation with a suitable wash solution. Conveniently, the reaction product mass can be washed with a mild aqueous sodium bicarbonate solution followed by a water wash to remove traces of the bicarbonate wash solution.

In the next step of my process the separated 7,8-epoxy equilin compound is treated via an acid catalyzed reaction to effect cleavage of the epoxy ring and introduction of the 7(8) and 9(10) equilenin double bonds (i.e. aromatization) in the B ring. I have found that this can be effected by treating the 8,9-epoxy equilin compound with an organic solvent solution containing a minor amount of a strong acid, preferably, less than about 20% by weight and for best results about from 5 to 15% by weight. Suitable strong acids include, for example, mineral acids, such as for example sulfuric acid, hydrochloric acid, perchloric acid, and the like; and strong organic acids, such as for example, p-toluenesulfonic acid, trifluoroacetic acid and the like. Any suitable solvent which will dissolve at least a portion of the epoxy equilin compound, and which will not adversely effect the desired reaction or product can be used. Suitable solvents include, for example, lower alkyl alcohols having from 1 through 6 carbon atoms, tetrahydrofuran, dimethylformamide, acetone, diglyme, glyme, methyl ethyl ketone, and the like. Also suitable aqueous mixtures of these or other suitable solvents can be used. I have further found that best results are obtained using a methyl or ehtyl alcohol-aqueous sulfuric acid solution containing about from 5 to 15% by weight sulfuric acid. The reaction is typically carried out at temperatures in the range of about from 20° C. to reflux for about from 1 to 15 hours, with best results being obtained using temperatures in the range of about from 40° C. to reflux. The resulting equilenin product can then be recovered by any suitable separation method. For example, by evaporation of the residual alcohol components followed by extraction of the equilenin compound with a suitable solvent such as, for example, ethyl acetate. The crude equilenin solution is preferably, then washed with a dilute base, such as, for example, dilute aqueous sodium bicarbonate, then washed with water, concentrated, and further purified by recrystallization with a suitable solvent such as, for example, acetone.

If desired, the equilin product can be converted to the corresponding sulfate, either before or after separation by any suitable sulfate forming reaction. For example, I have found that this reaction can be quite conveniently effected by the prior art process of reacting equilenin with a mixture of pyridine and chlorosulfonic acid.

Separation of the equilenin sulfate can be effected by conventional procedures (note for example, U.S. Patent 2,828,300). Where alkali metal salts of equilenin sulfate are desired, the sulfate can be further reacted with a suitable alkali metal base or salt such as, for example, sodium hydroxide, potassium hydroxide, sodium carbonate, potassium carbonate and the like. The details of the latter reaction are well known and can, for example, be obtained from prior art references such as, for example, U.S. Pats. No. 2,597,471 (e.g. sodium equilenin sulfate); and 2,597,723 (e.g. sodium equilin sulfate).

A further understanding of the invention can be had from the following non-limiting examples.

EXAMPLE 1

This example illustrates a method, according to my invention, of preparing equilenin from equilin.

In this example, 3 g. of equilin (0.011 M) are epoxidized in a solution containing 20 ml. of chloroform-tetrahydrofuran (1:1 by weight) and 50 ml. of 1 N monoperphthalic (0.05 M) acid ethyl acetate solution at 5° C. for 48 hours. The reaction mixture is then washed with dilute aqueous solution of $NaHCO_3$ and then washed with water. The reaction mixture is dried over sodium sulfate. 7,8-epoxy equilin is then isolated from the reaction mixture by evaporation and further purified by crystallization with acetone. The crystallized 7,8-epoxy equilin is found to have a M.P. of 183–186° C. The epoxy equilin is then refluxed in 50 ml. of methanol and 55 ml. of aqueous $H_2SO_4$ (20% wt.) for 4 hours and then cooled to room temperature (i.e. about 20° C.). Crude equilenin is separated from the cooled reaction mass by filtration and then washed with water. The crude equilenin is dissolved in 25 ml. acetone and then crystallized from the acetone. The crystallized product is examined by standard analytical procedures and is found to be equilenin.

EXAMPLE 2

This example illustrates a method according to my invention of preparing equilenin-3-acetate.

In this example 3.25 g. of equilin-3-acetate is epoxidized by treatment with a solution containing 1.8 g. of perbenzoic acid in 60 ml. of chloroform at 10° C. for 16 hours. The reaction mixture is then washed with dilute aqueous $NaHCO_3$ solution, then washed with water, and then dried over sodium sulfate. 7,8-epoxy equilin-3-acetate is evaporated from the reaction mixture and then further purified by crystallization from acetone. The epoxy equilin- 3-acetate is then treated with a solution of 50 ml. of tetrahydrofuran and 50 ml. of aqueous HCl (25% by wt.) for 12 hours at room temperature (i.e. about 20° C.). Crude equilenin-3-acetate is recovered from the reaction mixture by filtration. The crude equilenin-3-acetate is washed with water and then purified by crystallization using an acetone solvent. The crystallized product is examined according to standard analytical procedures and found to be equilenin-3-acetate.

EXAMPLE 3

This example illustrates a method according to my invention of preparing equilenin-3-methyl ether. In this example, 3 g. of equilin-3-methyl ether is epoxidized by treatment with a solution containing 2.6 g. of m-chloroperbenzoic acid in 60 ml. of dimethylformamide, at 0° C. for 36 hours. The reaction mixture is then washed with dilute aqueous sodium bicarbonate solution, then washed with water, then dried over sodium sulfate. 7,8-epoxy equilin-3-methyl ether is evaporated from the reaction mixture and further purified by crystallization using an acetone solvent. The epoxy equilin-3-methyl ether is then refluxed with 100 ml. of monoglyme and 10 ml. of aqueous p-toluenesulfonic acid (10% by wt.) for 5 hours. The reaction mixture is then cooled to room temperature (about 20° C.) diluted with water and the crude equilenin-3-methyl ether separated by filtration. The crude equilenin-3-methyl ether is then washed with water and further purified by crystallization using an acetone solvent. The crystalline product is determined by standard analytical procedures to be equilenin-3-methyl ether.

EXAMPLE 4

This example illustrates a method according to my invention of preparing equilenin-3-cyclopentyl propionate. In this example 4 g. of equilin-3-cyclopentyl propionate is epoxidized by treatment with a solution containing 2.3 g. of monoperphthalic acid in 50 ml. of dioxane, at 20° C. for 14 hours. The reaction mixture is then washed with dilute aqueous sodium bicarbonate solution, then washed with water, and then dried over sodium sulfate. The 7,8-epoxy equilin-3-cyclopentyl propionate is evaporated from the reaction mixture and then further purified by crystallization using an acetone solvent. The recovered epoxy equilin-3-cyclopentyl propionate is then treated with a solution containing 50 ml. of 20% of aqueous sulfuric acid and 50 ml. of ethyl alcohol, for 15 hours at 50° C. The reaction mixture is then cooled to room temperature (about 20° C.), diluted with water, and the crude equilin-3-cyclopentyl propionate recovered by filtration. The crude product is then washed with water and further purified by crystallization using an acetone solvent. The crystallization is examined by standard analytical procedures and found to be equilenin-3-cyclopentyl ether.

EXAMPLE 5

This example illustrates a method according to my invention of preparing equilenin-3-cyclopentyl ether. In this example 3.3 g. of equilin-3-cyclopentyl ether is epoxidized by treatment with a solution containing 3 g. of m-chloroperbenzoic acid in 60 ml. of benzene, at 15° C. for 30 hours. The reaction mixture is then washed with aqueous sodium bicarbonate solution and then washed with water and then dried over sodium sulfate. 7,8-epoxy equilin-3-cyclopentyl ether is evaporated from the mixture and further purified by crystallization using an acetone salt. The epoxy equilin-3-cyclopentyl ether is then refluxed with 50 ml. of acetone, 10 ml. of H₂O and 10 ml. of trifluoroacetic acid for 20 hours. The reaction mixture is then cooled to room temperature (about 20° C.) and diluted with water, and the crude equilenin-3-cyclopentyl ether recovered by filtration. The crude product is then washed with water and then purified by crystallization using acetone or solvent. The crystalline product is then examined according to standard analytical procedures and found to be equilenin-3-cyclopentyl ether.

EXAMPLE 6

This example illustrates a method according to my invention of preparing equilenin-3-monobenzoate.

In this example 4 g. of equilin-3-monobenzoate is epoxidized by treatment with a solution containing 1.7 g. of perbenzoic acid in 60 ml. of chloroform, at 15° C. for 8 hours. The reaction mixture is then washed with aqueous sodium bicarbonate solution, then washed with water, and then dried over sodium sulfate. 7,8-epoxy equilin-3-monobenzoate is evaporated from the reaction mixture and then further purified by crystallization using acetone as solvent. The epoxy equilin-3-monobenzoate is then refluxed with a solution containing 50 ml. of aqueous sulfuric acid containing 20% by weight sulfuric acid, and 50 ml. of isopropyl alcohol, for 16 hours. The reaction mixture is then cooled to room temperature (about 20° C° C.), diluted with water, and the crude equilenin-3-monobenzoate recovered by filtration. The crude product is then washed with water and then purified by crystallization using an acetone solvent. The crystalline product is examined using the standard analytical procedures and determined to be monobenzoate.

Obviously, many modifications and variations of the invention, described hereinabove and in the appended claims, can be made without departing from the essence and scope thereof.

What is claimed is:

1. A method of preparing equilenin compounds which comprises the steps of:
   (a) treating an equilin compound having the formula:

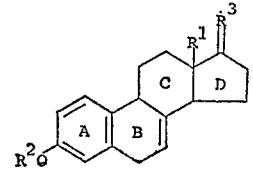

wherein R¹ is a lower alkyl having from 1 through 6 carbon atoms; R²O is selected from the group consisting of hydroxy, hydrolyzable esters and acid labile ethers having less than 12 carbon atoms; and R³ is selected from the group consisting of oxo and the group

wherein R⁴ is selected from the group consisting of H and ethynyl, with an inert organic liquid carrier containing an epoxidation agent, under reactive conditions whereby the corresponding 7,8-epoxy equilin compound having a saturated B ring is obtained; and
   (b) treating said 7,8-epoxy equilin compound with a strong acid in an inert organic solvent for said epoxy compound containing a minor amount of said strong acid in solution, under reactive conditions whereby the corresponding equilenin compound is formed.

2. The process of claim 1 wherein said equilin compound is treated with said liquid carrier, containing said epoxidation agent, at temperatures in the range of about from −5 to 50° C. for about from 4 to 48 hours.

3. The process of claim 2 wherein said temperatures are in the range of from about 0 to 5° C.

4. The process of claim 1 wherein said epoxidation agent is selected from the group consisting of monoperphthalic acid, perbenzoic acid, and m-chloroperbenzoic acid.

5. The process of claim 1 wherein said liquid carrier is selected from the group consisting of benzene, methylenedichloride, tetrahydrofuran, chloroform, and mixtures thereof.

6. The process of claim 1 wherein said strong acid is selected from the group consisting of sulfuric acid, hydrochloric acid, hydrobromic acid, perchloric acid, p-toluenesulfonic acid, and trifluoroacetic acid.

7. The process of claim 1 wherein said inert organic solvent is selected from the group consisting of tetrahydrofuran, dimethylformamide, pyridine, methylethyl ketone, and lower alkyl alcohols having from 1 through 6 carbon atoms.

8. The process of claim 1 wherein said epoxy compounds are treated with said organic solvent at temperatures in the range of about from 20° C. to the reflux temperature, for about from 1 to 15 hours.

9. The process of claim 1 wherein said organic solvent contains less than about 20% by weight of said strong acid.

10. The process of claim 1 wherein said epoxidation agent is monoperphthalic acid and wherein said liquid carrier is a mixture of tetrahydrofuran and chloroform having a weight ratio of tetrahydrofuran to chloroform of about from 1 to 10 and contains at least one mol of monoperphthalic acid per mol of tetrahydrofuran-chloroform mixture.

11. The process of claim 1 wherein said organic solvent is selected from the group consisting of methyl alcohol and ethyl alcohol, and contains about from 5 to 15% by weight sulfuric acid.

12. The process of claim 1 wherein said equilin compound is treated with about from 1.1 to 10 mols of epoxidation agent per mol of equilin compound.

13. A method for preparing equilenin which comprises treating equilin with monoperphthalic acid in a mixture of tetrahydrofuran chloroform at temperatures in the range of from 0 to 10° C. for about from 4 to 48 hours whereby the corresponding 7,8-epoxy equilin having a saturated B ring is obtained, and treating said 7,8-epoxy equilin compound with an organic solvent selected from the group consisting of methanol, ethanol, and tetrahydrofuran, containing about from 5 to 15% by weight of a strong acid at temperatures in the range of about from 40° C. to the reflux temperature, for about from 1 to 15 hours thereby forming equilenin.

No references cited.

HENRY A. FRENCH, Primary Examiner

U.S. Cl. X.R.

260—239.55 R, 397.5, 999